Figure 1:
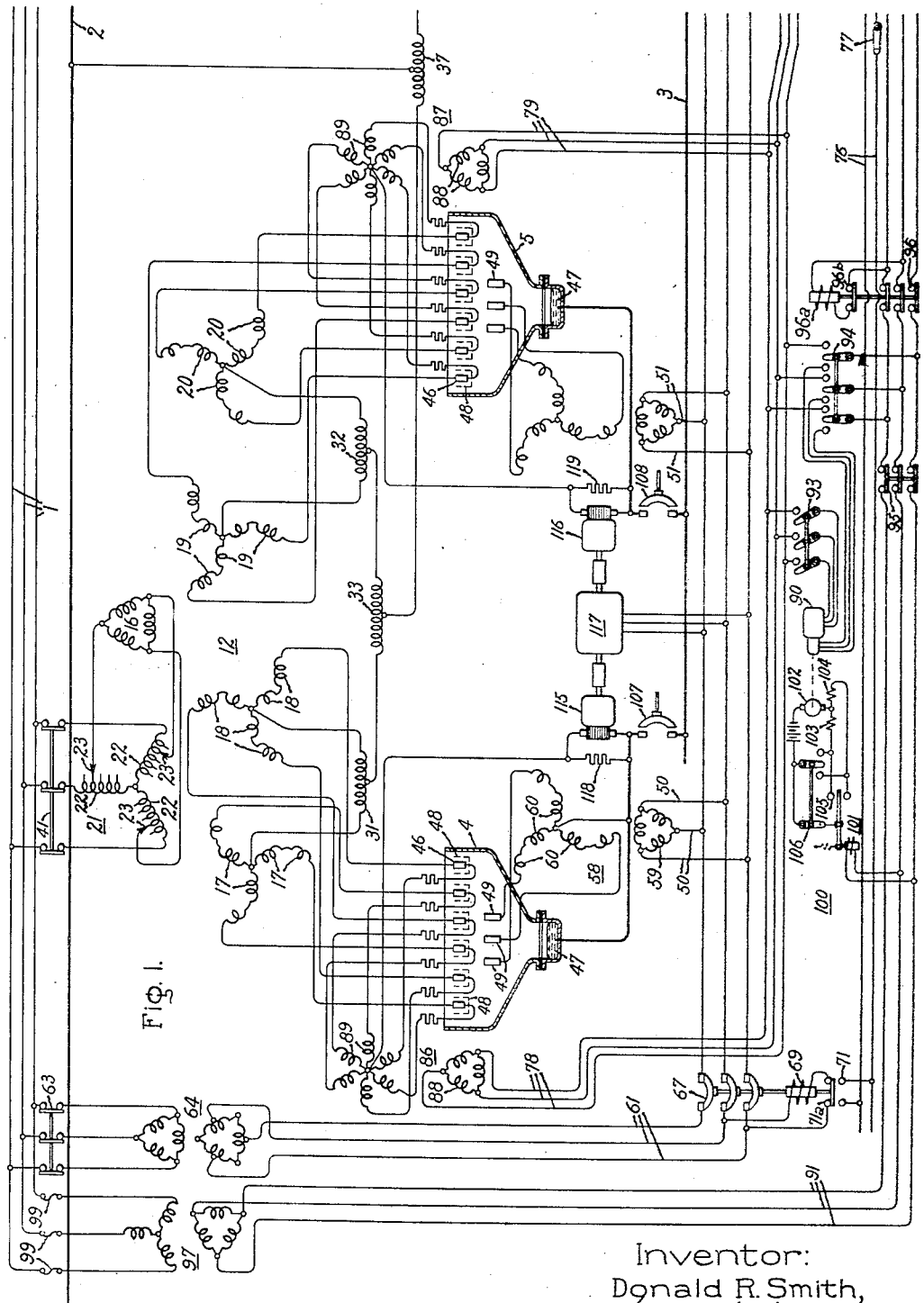

Nov. 5, 1940.　　　D. R. SMITH　　　2,220,735

ELECTRIC VALVE CIRCUIT

Filed April 6, 1939　　　2 Sheets-Sheet 1

Inventor:
Donald R. Smith,
by Harry E. Dunham
His Attorney.

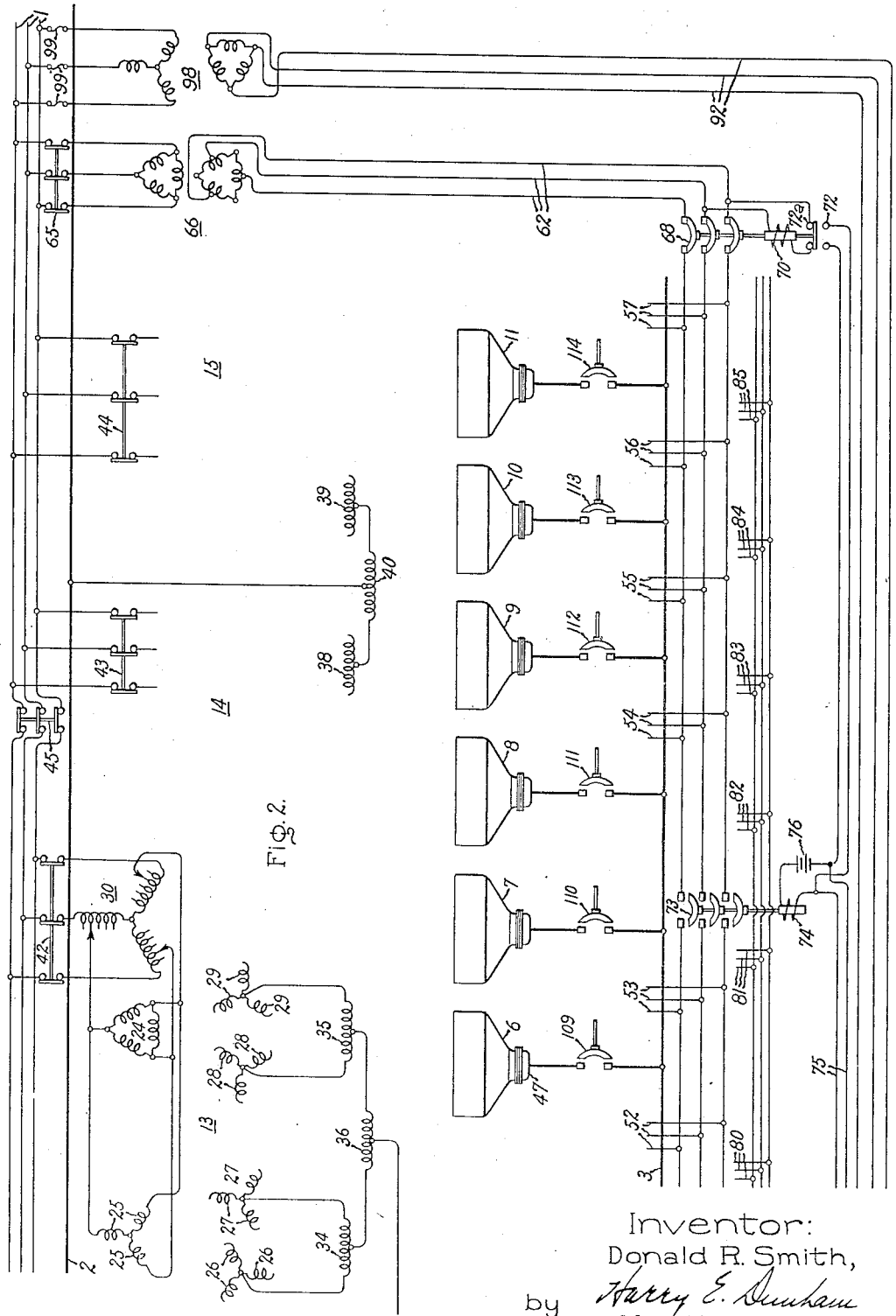

Patented Nov. 5, 1940

2,220,735

UNITED STATES PATENT OFFICE 2,220,735

ELECTRIC VALVE CIRCUIT

Donald R. Smith, Scotia, N. Y., assignor to General Electric Company, a corporation of New York Application April 6, 1939, Serial No. 266,398

3 Claims. (Cl. 175—363)

My invention relates to electric valve circuits and more particularly to control circuits for electric valve translating apparatus.

In electric valve applications for power purposes, it is extremely important in many instances to assure continuity of service by the provision of additional control or supervisory equipment. For example, in electric valve power equipment for transmitting relatively large quantities of direct current to an associated direct current load circuit from an alternating current supply circuit through a plurality of electric valve means, it is important to maintain at all times a suitable source of control voltage for the electric valve means. In addition, where the load is transmitted concurrently by a plurality of parallel operating electric valve means, it is desirable to maintain a predetermined division or distribution of load among the various electric valve means. In accordance with the teachings described hereinafter, I provide new and improved control circuits whereby a predetermined division of load may be maintained among various parallel operating electric valve means and whereby reliability and continuity of service are assured.

It is an object of my invention to provide a new and improved electric valve translating circuit.

It is another object of my invention to provide a new and improved control system for electric valve translating apparatus.

It is a further object of my invention to provide new and improved control circuits for electric valve means operating in parallel.

Briefly described, in the illustrated embodiment of my invention, I provide a new and improved control system for electric valve translating apparatus which energizes a direct current load circuit from an associated alternating current supply circuit through a plurality of electric valve means operating in parallel. The electric valve means are connected to transmit current to the load circuit and are of the controlled type, each having a plurality of control members for controlling the conductivities of the associated arc discharge paths. Each of the electric valve means is provided with an excitation circuit which impresses on the control members suitable control voltages to determine or control the amount of current conducted by that electric valve means. Each of the excitation circuits comprises a control device or phase shifting device which impresses on the control members suitable voltages to control the output of the electric valve means. A master control device or master phase shifter controls the excitation circuits simultaneously to effect control of the output of the electric valve means. As a means for assuring continuity of service, I provide a plurality of control circuits for energizing the excitation circuits and I also provide a means for effecting selective energization of the excitation circuits from the control circuits, so that in the event of failure of one of the control circuits energization of the excitation circuits may be effected from another control circuit.

For a better understanding of my invention, reference may be had to the following description taken in connection with the accompanying drawings, and its scope will be pointed out in the appended claims. Figs. 1 and 2, considered conjointly, represent an embodiment of my invention as applied to a twenty-four phase electric valve translating circuit for transmitting power between a three phase alternating current supply circuit and a direct current load circuit.

Considering Figs. 1 and 2 conjointly, my invention is there diagrammatically illustrated as applied to an electric valve translating system for transmitting power between an alternating current circuit 1 and a direct current circuit comprising conductors 2 and 3. For the purposes of illustration, my invention is shown as applied to a twenty-four phase system for transmitting power between the alternating current circuit and the direct current circuit. The electric valve translating system comprises a plurality of electric valve means 4—11 which are energized by transformers 12, 13, 14 and 15. Electric valve means 4 and 5 are energized by transformer 12, and electric valve means 6 and 7 are energized by transformer 13. In like manner, electric valve means 8, 9 and 10, 11 are energized by transformers or transformer banks 14 and 15 (not shown). The transformers may be connected in the manner disclosed and claimed in a copending patent application of Everett F. Christensen, Serial No. 235,628, filed October 18, 1938, and assigned to the assignee of the present application. Transformer 12 comprises delta-connected primary windings 16 and groups of secondary windings 17—20. In order to control the voltage impressed on the primary windings 16 of transformer 12, I may employ any suitable arrangement such as an auto-transformer 21 having a plurality of windings 22 and an adjustable contact means 23. Transformer 13, which energizes electric valve means 6 and 7, comprises two groups of primary windings 24 and 25, the former of which is delta-connected and the latter of which is star-connected. The transformer 13 also has a plurality of groups of secondary windings 26-29, inclusive. A voltage controlling means, such as an auto-transformer 30, may be employed to control the voltages impressed on primary windings 24 and 25 of transformer 13. The transformers or transformer banks 14 and 15 (not illustrated) are similar in construction and arrangement to transformers 12 and 13, respectively. Interphase transformers 31 and 32 are connected between secondary windings 17, 18 and 19, 20 respectively of transformer 12, and interphase transformer 33 is connected to interphase transformers 31 and 32 so that the secondary windings and associated electric valve means 4 and 5 operate as a twelve phase arrangement. In like manner, the interphase transformers 34, 35 and 36 are associated with secondary windings 26—29 of transformer 13 and also, in turn, operate as a twelve phase system displaced with respect to the secondary voltages of transformer 12. The two twelve phase systems are interconnected by means of an interphase transformer 37, so that the resultant ripple corresponds to a twenty-four phase system. All of the interphase transformers of the transformer banks 14 and 15 are not shown. However, interphase transformers 38, 39 and 40 are shown corresponding in function to interphase transformers 33, 36 and 37.

Suitable circuit controlling means, such as contactors or switches 41—44, may be connected between transformer banks 12—15, respectively. A suitable isolating switch 45 may be connected between the two parts of the system, that is, between electric valve means 4—7 and 8—11, respectively.

The electric valve means 4—11 are preferably of the type employing an ionizable medium, such as a gas or a vapor, and each may include a plurality of anodes 46, a self-reconstructing cathode such as a mercury pool cathode 47, and a plurality of control members 48 which control the conductivities of the associated arc discharge paths. The electric valve means 4—11 may each be provided with a plurality of holding or arc maintaining anodes 49.

The holding anodes 49 of the electric valve means 4—11 may be energized from a plurality of circuits 50—57, respectively. Each of the circuits 50—57, respectively, may comprise a suitable transformer 58 having primary windings 59 and secondary windings 60 for energizing the holding anodes 49. The circuits 50—57 in turn may be energized from a plurality of control circuits 61 and 62. Circuit 61 may be energized from the alternating current circuit 1 through a switching means or contactor 63 and a transformer 64, and control circuit 62 may be energized from circuit 1 through a switching means 65 and a transformer 66. Under normal operating conditions circuits 50—53 are energized from control circuit 61 through switch 67, and circuits 54—57 are energized from control circuit 62 through switch 68. Switches 67 and 68 are provided with operating coils 69 and 70, respectively, and are also provided with auxiliary contacts 71, 71a and 72, 72a. An interconnecting switch 73 is provided to connect circuits 50—53 and 54—57 in the event either of control circuits 61 or 62 becomes defective or inoperative, so that all of the holding anodes of the electric valve means 4—11 may be energized to assure continuity of service. Switch 73 is provided with an actuating coil 74 which is connected to a control circuit 75 which in turn is energized from a battery 76 through the auxiliary contacts 71 and 72 of switches 67 and 68. A suitable circuit controlling means, such as a switch 77, may be employed to interrupt circuit 75 to open switch 73.

Actuating coils 69 and 70 of switches 67 and 68 are connected to be responsive to a predetermined electrical condition of control circuits 61 and 62, respectively. When the predetermined electrical condition is satisfied, as, for example, when the circuits 61 and 62 are in condition for satisfactory operation, coils 69 and 70 are energized from circuits 61 and 62 through auxiliary contacts 71a and 72a, respectively. In the event the voltage of either one of these circuits fails, the associated coil 69 or 70 is deenergized and the switch drops to the open circuit position.

I provide a plurality of excitation circuits 78—85 for energizing the control members 48 of electric valve means 4—11. It is to be understood that an excitation circuit is associated with each of the electric valve means, and for the purpose of simplifying the illustration of the invention, only excitation circuits 78 and 79 associated with electric valve means 4 and 5 have been shown in detail. The excitation circuits 78 and 79 each comprise a control device which may be phase shifting devices 86 and 87, respectively. The phase shifting devices may be of the rotary phase shifting type having distributed primary windings 88 and secondary windings 89. Of course, the phase shifters 86 and 87 may be of the type including controllable or adjustable static impedance elements, such as combinations of resistances, inductances or capacitances. The phase shifters 86 and 87 may also be of the adjustable or controllable type to control the phase of the voltage impressed on control members 48 with respect to the voltages of the associated anodes. The excitation circuits 78—85 are connected to be energized from a master phase shifting device 90 which, in turn, is connected to be energized from a suitable source of alternating current, such as circuit 1, through control circuits 91 and 92. A switch 93 may be connected between excitation circuits 78—85 and the master phase shifter 90, and a switch 94 may be connected between the master phase shifter and circuits 91 and 92 to disconnect or connect the master phase shifter 90 to excitation circuits 78—85. Switches or contacts 95 and 96 are connected in control circuits 91 and 92, respectively, to permit energization of the excitation circuits 78—85 from either or both of these control circuits. Switches 95 and 96 may be arranged to be maintained normally in the closed circuit position so that the excitation circuits are energized from both circuits 91 and 92, and in the event one of the control circuits becomes defective or inoperative the associated switch may be opened so that the excitation circuits are nevertheless energized, thereby assuring continuity of control voltage. For example, switch 96 may be provided with an actuating coil 96a and a pair of auxiliary contacts 96b to maintain the switch 96 closed so long as the voltage of the control circuit 92 is in satisfactory operating condition. However, when the voltage of circuit 92 fails, coil 96a becomes deenergized and opens switch 96. A similar operating mechanism may be associated with switch 95. Switches 95 and 96 may be arranged so that the excitation circuits are normally energized from only one of the control circuits 91 and 92, in which case in the event the operating control circuit becomes defective, switches 95 and 96 are actuated to disconnect the defective control circuit and connect the excitation circuits to the other control circuit. If it is desired to energize the excitation circuits from only one of control circuits 91 and 92 during normal operating conditions and to effect a transfer of control from the defective circuit to the circuit in operating condition, a control circuit and interlocking mechanism similar to control circuit 75 and contacts 71 and 72 of switches 67 and 68 may be employed. Control circuits 91 and 92 may be energized from an alternating current circuit of suitable phase and frequency, such as the alternating current circuit 1, through transformers 97 and 98, respectively. Suitable current limiting or protective devices, such as fuses 99, may be employed if desired.

As a means for controlling the conductivities of all of the electric valve means 4—11 in response to a predetermined controlling influence and at the same time maintaining a predetermined distribution of load among the various electric valve means, I provide a control circuit 100. The control circuit 100 may be responsive to a predetermined electrical condition of the system, such as the voltage of the alternating current circuit 1, and may comprise a regulator 101. A positioning motor 102 may be mechanically coupled to the master phase shifter 90. The motor 102 may have a pair of field windings 103 and 104, the energization of which is controlled by contacts 105 of regulator 101. A switch 106 may be used to connect the regulator 101 operatively in the circuit or to effect manual control or positioning of the motor 102.

Switches or contactors 107—114 are connected between the conductor 3 and the cathodes 4—7 of electric valve means 4—11, respectively. As a means for producing a negative unidirectional biasing potential which is impressed on the control members 48 of electric valve means 4—11 through the secondary windings of transformer banks 12—15, I provide any suitable arrangement, such as direct current generators 115 and 116, which in the drawing are shown as being associated with electric valve means 4 and 5. It is to be understood that corresponding generators (not shown) are associated with the electric valve means 6—11. The generators 115 and 116 may be driven by any suitable motor, such as an alternating current motor 117, energized from either control circuit 61 or 62. Generators 115 and 116 produce unidirectional voltages across the terminals of resistances 118 and 119 which are connected in the control circuits for control members 48.

The operation of the embodiment of my invention diagrammatically illustrated in Figs. 1 and 2 will be explained by considering the system when it is operating as a double twenty-four phase system for supplying unidirectional current to the direct current circuit comprising conductors 2 and 3 from the alternating current circuit 1. Electric valve means 4—7 operate as a twenty-four phase rectifier and electric valve means 8—11 also operate as a twenty-four phase rectifier. The manner in which these rectifiers operate is more fully explained in the above identified copending patent application of Everett F. Christensen, Serial No. 235,628.

The distribution of load among the various electric valve means is effected by the adjustment of the rotary phase shifters in the various excitation circuits, of which rotary phase shifters 86 and 87 of excitation circuits 78 and 79 are exemplary. When switch 93 is in the closed circuit position and when switch 94 is in the left-hand position, the conductivities of the electric valve means 4—11 are controlled by means of the control or regulating circuit 100 through the master phase shifter 90. When switch 106 is in the position shown, regulator 101 controls the energization of field windings 103 and 104 to position the master phase shifter 90 in response to the voltage of circuit 1. If it is desired to maintain the output voltage at a substantially constant value, the input voltage of circuit 1 may be employed to adjust the phase of the voltages impressed on control members 48 in response to the variations in voltage of circuit 1. Of course, it is to be understood that the regulator 101 may be connected to be responsive to the voltage or current of the direct current load circuit including conductors 2 and 3.

Under normal operating conditions circuits 50—53 and 54—57 are energized from control circuits 61 and 62, respectively. Actuating coils 69 and 70 of switches 67 and 68 may be energized from circuits 61 and 62 and maintained in the closed circuit position so long as circuits 61 and 62 operate in a satisfactory manner. However, in the event one of the circuits fails, the associated switch will open effecting energization of control circuits 75 and consequently closing switch 73 by the energization of coil 74 thereof, in this manner assuring energization of all of circuits 50—57 in the event of failure of one of the associated control or supply circuits.

Energization of excitation circuits 78—85 is assured inasmuch as these excitation circuits are energized normally from either or both control circuits 91 and 92 through switches 95 and 96. However, it is to be understood that in the event either control circuit 91 or 92 becomes defective or inoperative, the associated switch may be operated automatically in response to that condition to disconnect the defective control circuit and to effect energization of the excitation circuits from the other control circuit.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a direct current circuit, a plurality of electric translating circuits connected between said first mentioned circuits and each including electric valve means having control members for controlling the conductivity thereof, a plurality of excitation circuits each associated with a different one of said electric valve means and each comprising a phase shifting device for adjusting the phase of the voltages impressed on the associated control members with respect to the voltage of said alternating current circuit, a plurality of control circuits energized from said alternating current circuit, a master phase shifting means for energizing the phase shifting devices to effect simultaneous control of the voltages impressed on said control members, and means for selectively energizing said master phase shifter from said control circuits.

2. In combination, an alternating current circuit, a direct current circuit, a plurality of electric translating circuits connected between said first mentioned circuits and each including electric valve means having control members for controlling the conductivity thereof, a plurality of excitation circuits each associated with a different one of said electric valve means and each comprising a phase shifting device for adjusting the phase of the voltages impressed on the associated control members with respect to the voltages of said alternating current circuit, a plurality of control circuits energized from said alternating current circuit, a master phase shifting means for energizing the phase shifting devices to effect simultaneous control of the voltages impressed on said control members, means for selectively energizing said master phase shifter from a predetermined one of said control circuits, and means for positioning said master phase shifter in accordance with a predetermined controlling influence.

3. In combination, an alternating current circuit, a direct current circuit, a plurality of translating circuits for translating power in parallel relation between said first mentioned circuits and each comprising electric valve means, control means for said electric valve means, a plurality of control circuits for energizing said control means, and means for effecting selective energization of said control means from said control circuits in response to a predetermined electrical condition of said control circuits.

DONALD R. SMITH.